Aug. 13, 1935.                O. W. HINER                 2,011,445
                               SPECULUM
                          Filed July 11, 1934
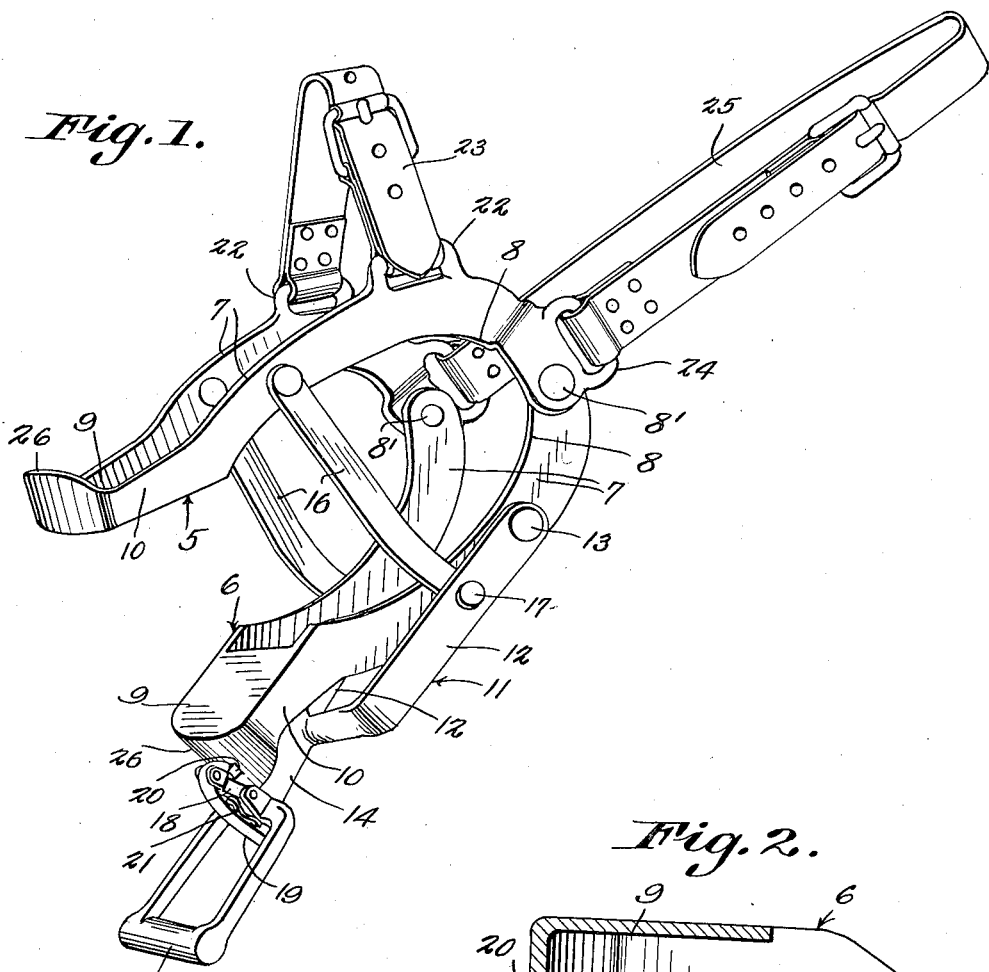
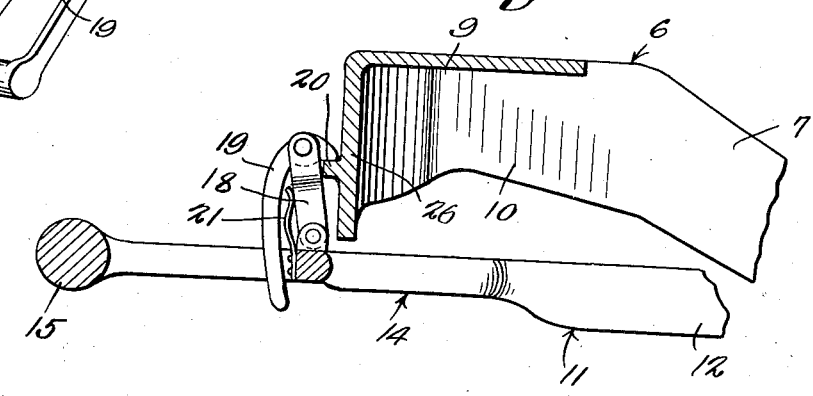
O. W. Hiner
Inventor
By C. A. Snow & Co.
Attorneys.

Patented Aug. 13, 1935

2,011,445

UNITED STATES PATENT OFFICE 2,011,445

SPECULUM

Ora W. Hiner, Butler, Ind.

Application July 11, 1934, Serial No. 734,665

4 Claims. (Cl. 128—14)

This invention relates to a speculum designed primarily for use in holding the mouth of a horse open, while administering medicine or treating the teeth or organs accessible through the mouth and throat.

An important object of the device is to provide a device of this character embodying pivotally connected jaws, and means for opening the jaws and holding the jaws in their open positions.

Another object of the invention is the provision of wide tooth engaging members, constructed in such a way that all danger of the instrument injuring the mouth of the animal is eliminated.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

Referring to the drawing:

Figure 1 is perspective view of a speculum constructed in accordance with the invention.

Figure 2 is a fragmental sectional view through the forward end of the lower jaw section.

Referring to the drawing in detail, the speculum forming the subject matter of this invention, embodies upper and lower jaws 5 and 6 respectively, each jaw comprising spaced bars 7 having their inner ends curved as at 8, the extremities of the curved portions of the opposite jaws being pivotally connected, at 8', so that the jaws may pivot freely, with respect to each other.

As clearly shown by the drawing, the outer ends of the bars of each jaw, curve inwardly towards a mouth piece 9, which mouth pieces are substantially wide, so that the teeth of the animal with which the speculum is used, will fall directly onto the mouth pieces, without danger of the speculum slipping to injure the lips or gums of the animal.

It will further be seen that these mouth pieces are so arranged at the ends of the jaws, that wide flanges 10 are provided and surround the mouth pieces, preventing the speculum from slipping, while being positioned over the head of an animal.

Pivotally connected to the lower jaw section of the speculum, is a substantially U-shaped operating lever 11 embodying legs 12 which are pivotally connected to the bars of the lower jaw, at 13, the lever being of a length to extend to a position beyond the front end of the speculum, where it may be readily gripped by the operator, when it is desired to move the jaws to their open positions.

Extending forwardly from the lever, is a bar 14 to which the handle 15 is connected, the handle being of a shape whereby the operator may readily grip the same to direct pressure to the operating lever in opening the jaws against the action of the muscles of the jaws of the animal.

This handle 15 also affords means whereby the animal's head may be held against movement.

Links 16 are pivotally connected to the bars of the upper jaw, at points intermediate the ends thereof, the lower ends of the links 16 being pivotally connected to the operating lever 11, at 17. Thus it will be seen that due to this construction the jaws are moved away from each other, or to their open positions, when the operating lever 11 is pulled upwardly, with the result that the jaws of the animal with which the speculum is used, are moved to their open positions.

Mounted on the lever 11 is a latch member which embodies a pivoted link 18 to which the lever 19 is pivotally connected, the lever 19 being of a length to extend below the lever 11, whereby it may be readily engaged by the fingers of the operator, to release the latch when it is desired to remove the speculum. As clearly shown by Figure 2 of the drawing, the lever 19 engages the lug 20, when the latch member is in its active position. A spring 21 engages the link 18, and normally acts to urge the latch member into engagement with the lug.

Loops 22 are formed integral with the bars of the upper jaw, and accommodate the nose strap 23, while the loops 24 extend rearwardly from the bars of the upper jaw, accommodating the strap 25 which secures the speculum to the head of the animal.

It might be further stated that the bars of the jaws are connected by means of the end pieces 26, which extend beyond the outer edges of the bars of the jaws, providing flanges that fit between the lips and gums of the animal, holding the lips of the animal out of the way of a person working on the mouth of the animal.

It will of course be understood that the construction of the jaws is such that the bars thereof will fit against the sides of the face and head of the animal, and the forward ends thereof will fall opposite to the teeth so that the device may be readily and easily positioned.

It is believed that in view of the foregoing description, a further detailed description as to the operation of the device is unnecessary.

Having thus described the invention what is claimed is:

1. A speculum comprising a pair of jaws pivotally connected, each jaw embodying spaced bars adapted to fit against the sides of the face of the animal wearing the speculum, a mouth piece at the outer end of each jaw and in which the teeth of the animal rest, flanges extending from the mouth pieces and adapted to engage the outer sides of the mouth of the animal, means for moving the jaws to their open positions, and means for securing the speculum to the head of an animal.

2. A speculum comprising a pair of pivotally connected jaws, each jaw embodying spaced bars, a wide flat mouth piece at the forward end of each jaw, the forward ends of the bars providing flanges around the outer sides of the mouth pieces, said flanges adapted to contact with the outer surfaces of the jaw of the animal wearing the speculum, restricting lateral movement of the speculum with respect to the animal's head, means for moving the jaws to their open positions, and means for securing the speculum to the head of an animal.

3. A speculum comprising upper and lower pivotally connected jaws, mouth pieces at the forward ends of the jaws, flanges extending outwardly from the mouth pieces and adapted to rest against the sides of the mouth of the animal wearing the speculum, an operating member pivotally connected to one of the jaws and extending forwardly beyond the mouth pieces, links connected to the operating member and having pivotal connection with the upper jaw, whereby movement of the operating member moves the jaws with respect to each other, and means for securing the speculum to the head of an animal.

4. A speculum comprising a pair of jaws pivotally connected at their rear ends, each jaw embodying spaced members adapted to fit against the sides of the face of the animal wearing the speculum, mouth pieces at the free ends of the jaws against which the teeth of the animal engage, an operating lever adapted to move the jaws to their open or closed positions, said operating lever extending forwardly beyond the mouth pieces, means for securing the operating lever to the mouth piece of one jaw, and means for securing the speculum to the head of an animal.

ORA W. HINER.